Figure 1:
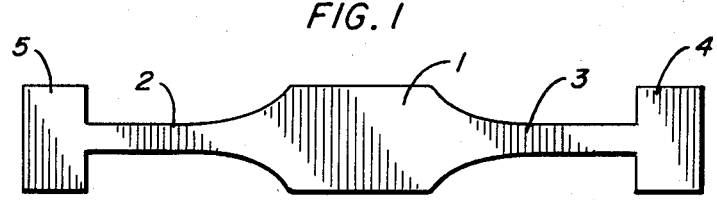

United States Patent [19]

Andreasson

[11] Patent Number: 4,641,523

[45] Date of Patent: Feb. 10, 1987

[54] LIQUID LEVEL GAUGE

[75] Inventor: Jan Andreasson, Mullsjö, Sweden

[73] Assignee: Skandiafabriken AB, Mullsjo, Sweden

[21] Appl. No.: 684,366

[22] Filed: Dec. 20, 1984

[30] Foreign Application Priority Data

Jan. 4, 1984 [SE] Sweden ................................. 8400037
Nov. 13, 1984 [SE] Sweden ................................. 8405679

[51] Int. Cl.$^4$ .............................................. G01F 23/60
[52] U.S. Cl. ........................................ 73/313; 73/308; 338/33
[58] Field of Search .................. 73/308, 313, 317, 320; 338/33

[56] References Cited

U.S. PATENT DOCUMENTS

| 3,433,073 | 3/1969 | Kunert | 73/313 |
| 3,555,904 | 1/1971 | Lenker | 73/313 |
| 3,813,941 | 6/1974 | Miguel et al. | 73/313 |
| 4,342,224 | 8/1982 | Hara et al. | 73/313 X |

Primary Examiner—Daniel M. Yasich
Attorney, Agent, or Firm—Dennison, Meserole, Pollack & Scheiner

[57] ABSTRACT

It is desirable to be able to indicate the quantity of liquid left in the fuel tank of a vehicle. This is conventionally achieved with the aid of a float movable along a resistance wire. The invention offers an improved design of a liquid gauge consisting of two parallel rods (16 and 17), having resistance wires (18,19 respectively) wound around them and being surrounded by a float (6,7,15) with a contact (1-5) connecting the two resistance wires (18 and 19) to each other and arranged between the two wires (18 and 19).

13 Claims, 8 Drawing Figures

U.S. Patent  Feb. 10, 1987  Sheet 1 of 3  4,641,523

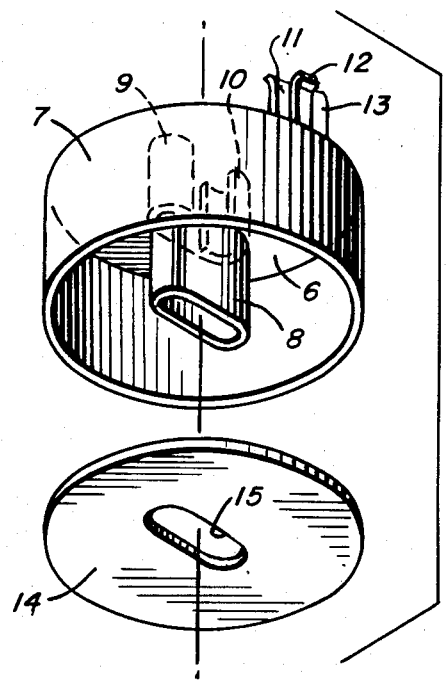
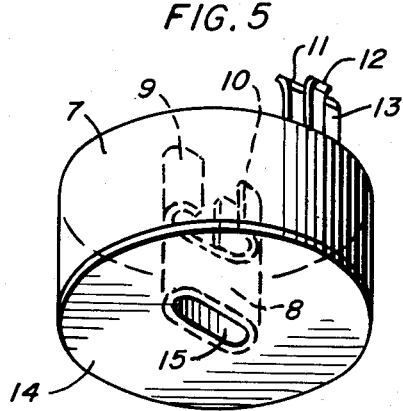
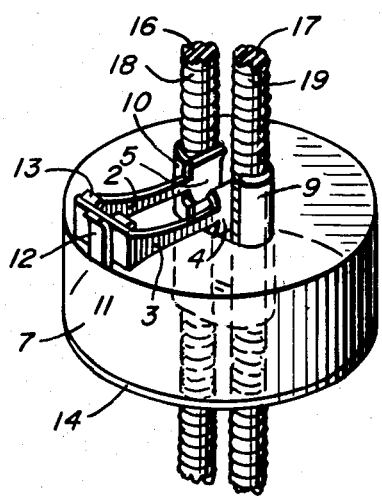

LIQUID LEVEL GAUGE

The present invention relates to a liquid gauge, particularly the type of level indicator used in the fuel tanks of transport means, such as cars, ships, aircraft, etc. It is already known to use resistance wires and floats with electrical contacts abutting the resistance wire, the float moving along the resistance wire depending on the level of the liquid. However, the known technique has not resulted in sufficiently reliable and simple constructions.

The object of the present invention is to produce a liquid level gauge which is extremely simple in design. According to the invention the construction consists of two preferably elongate bodies, parallel to one another and having resistance wires wound around them. The bodies are provided at both ends with common retainers. A float is arranged around the two bodies, has a common aperture for them and is displaceable along the bodies. It is also provided with a trailing contact carried thereby for each resistance wire, the contacts being arranged between the two bodies for trailing movement with the float as the float is displaced along the bodies.

Each elongate body is provided at its end with a thin metal contact with which one end of the resistance wire is in electrical contact. The end of the resistance wires may either be the one nearest the thin metal contact or that furthest away.

One or both ends of the elongate bodies may be provided with surfaces of electrically conducting materials, the surfaces being in electrical contact with the nearest ends of the resistance wires or being entirely electrically insulated from the whole liquid gauge.

The trailing contacts abutting the resistance wires should cover at least three turns of each resistance wire.

According to an advantageous embodiment of the invention each trailing contact is provided with an abutting portion substantially parallel to the cooperating cylindrical body so as to abut with spring pressure, and is preferably also pivotable about an axis perpendicular to the axis of the cylindrical body.

The two trailing contacts and the portion connecting them are preferably produced by punching them from a metal sheet, the sheet from which they are punched being of resilient metallic material. The trailing contacts are located at the ends of the punched-out piece of metal and an intermediate part is intended for attachment to the float. Between the intermediate part and each trailing contact, the metal is such that each trailing contact can be subjected to a turning movement about the longitudinal axis of the metal part. The metal part is bent so that when the metal sheet portion is secured to the float and the trailing contacts abut the cylindrical bodies, there will be spring contact, i.e. irrespective of any lateral movement of the float each trailing contact will always be in contact with the cylindrical contact.

Instead of being surrounded by resistance wire, each cylindrical body may be coated with a layer of electrically conducting material.

It is advantageous if each cylindrical body, preferably consisting of a ceramic or plastic material which is not electrically conducting, is provided with a metal body running through it. This may be strip or rod-shaped, but rod-shaped is preferable.

The metal body preferably protrudes at least at one end of the cylindrical body. The protruding part can be used to secure the cylindrical body. The metal through-body may also be used as a conductor for electric current. One end of a resistance wire or a layer may, for instance, be electrically connected to the adjacent protruding end of the metal through-body.

The aperture through the float should be designed to prevent the float from rotating about the two cylindrical bodies.

The float should be dimensioned to prevent stick-slip motion, that is a tendency to stick or momentarily jam as it moves.

At least at one end the float may be provided externally with one or more guides to ensure minimum pivoting about an axis perpendicular to the cylindrical bodies.

The float suitably consists of two end walls with a peripheral wall between them, and is preferably cylindrical. The float may also be provided internally with guides to assist its movement along the cylindrical bodies. Buoyancy material may also be arranged in the space inside the float. The outer surfaces of the float ends are preferably such that when in contact with another surface, the contact area is limited to prevent retention.

The two cylindrical bodies with float are preferably arranged in a casing consisting of two end walls and a peripheral wall. The casing may consist of two parts which are joined together, each part including one end wall.

The inner surface of at least one end wall is such that upon contact with the float, the contact area is limited.

Further characteristics of the present invention will be revealed in the following claims.

Figure 2:
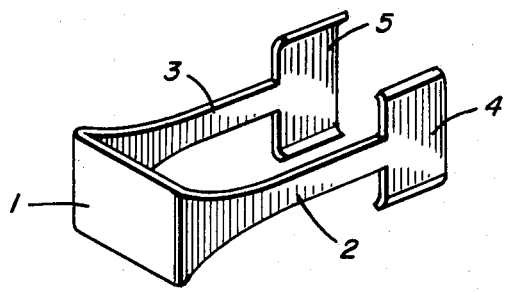
Figure 3:
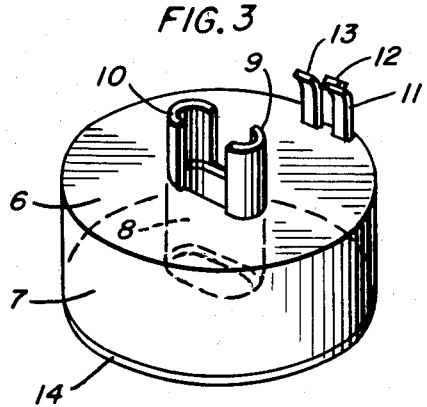
Figure 7:
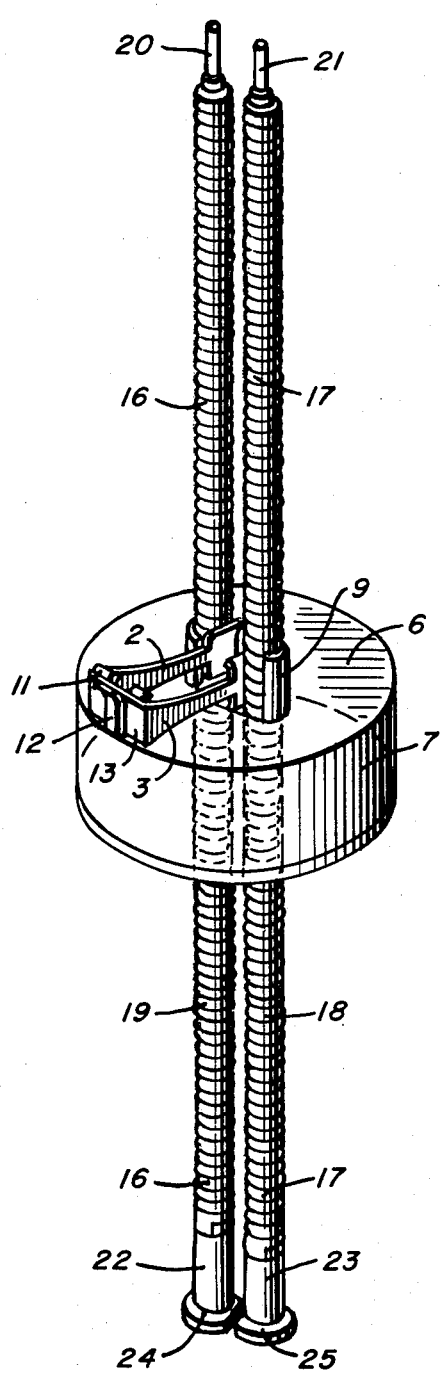
Figure 8:
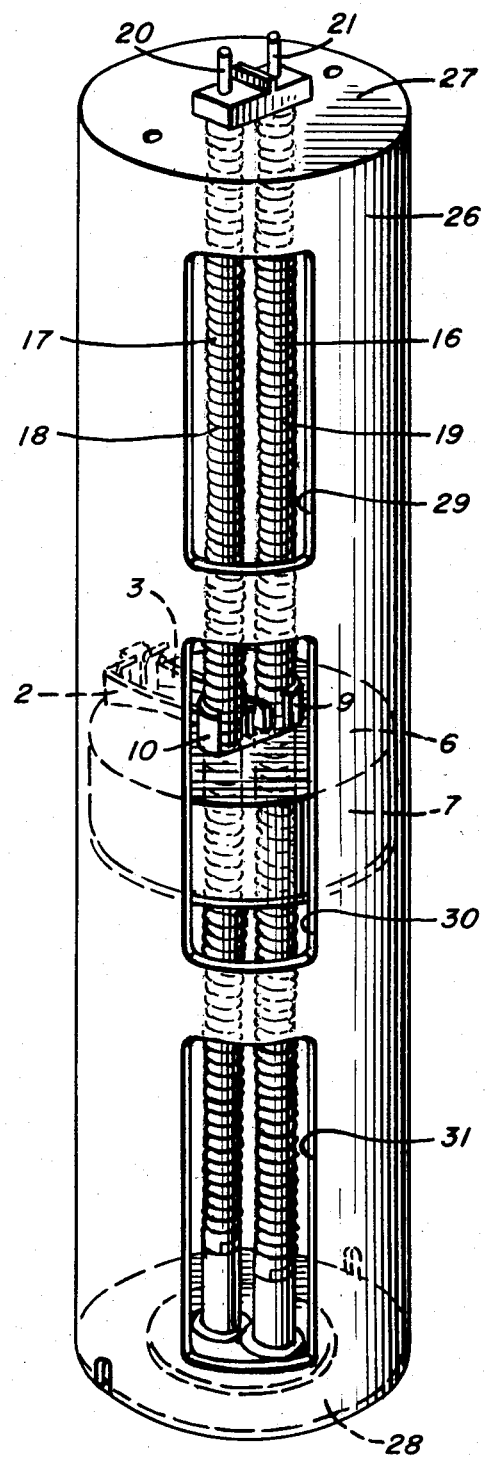

One embodiment of the present invention will be described in more detail with reference to the accompanying five drawings in which FIG. 1 shows the blank for an electrical contact means, FIG. 2 shows the contact means in FIG. 1 in its final shape, FIG. 3 shows the main part of a float, FIG. 4 shows the float according to FIG. 3 with its lid, FIG. 5 shows a complete float, FIG. 6 shows the float cooperating with two cylindrical bodies provided with resistance wires FIG. 7 shows the cylindrical bodies in final state and FIG. 8 shows the means according to FIG. 7 enclosed in a casing.

FIG. 1 shows a piece of metal sheet punched out of a resilient material. The metal sheet has an intermediate part 1 and two connecting parts 2 and 3 joining the intermediate part to two contacts 4 and 5. The punched metal blank is bent as shown in FIG. 2. Due to the resilience of the bent section the trailing contacts 4 and 5 always try to spring apart, i.e. they have a spring tension which operates transversely outwards. The unit according to FIG. 2 is designed to cooperate with a float, the construction of which is shown in FIGS. 3 and 4. The float is preferably manufactured in plastic and may be transparent. It consists of an upper end part or section 6 joined to a peripheral wall 7. An oval guide piece or part 8 protrudes from the upper end part 6, is tubular and has an opening in the end part 6. Two guides 9 and 10 extend from this latter opening and have the same peripheral shape as the tubular part 8. At the periphery of the end part 6 are three pins 11, 12 and 13, each pin having an outwardly directed flange at the top. The flanges on parts 11 and 13 are directed transversely outwards whereas the flange on part 12 is directed inwards. The float is open at its other end and is provided with a lid 14 having an aperture 15 to fit the circumference of the tubular part 8. The upper end section 6 and the lid 14 define opposed spaced end discs with the peripheral wall 7 therebetween. An assembled float is shown in FIG. 5. As noted in FIG. 6, a unit of the kind shown in FIG. 2 is fitted to the float, the intermediate part 1 being placed between the pins 11,12 and 13 with pins 11 and 13 located on one side the the intermediate part 1 and pin 12 on the other side. The unit shown in FIG. 2 thus has fixed orientation on the float. The float is then passed over two cylindrical bodies 16 and 17 around which resistance wires 18 and 19 have been wound. The float is placed around the resistance wires so that trailing contacts 4 and 5 are located between the two cylindrical bodies 16 and 17 and move or trail along with the float and in contact with the bodies 16 and 17 as the float moves therealong. This is achieved since the cylindrical bodies are parallel and spaced from each other. The cylindrical bodies 16 and 17 and the float thus form a liquid gauge as shown in FIG. 7. The lower ends of the two cylindrical bodies are connected to metallic sheaths 22 and 23, these sheaths being provided with a limiting flange 24 and 25 to enable orientation of the bodies when permanently placed. The resistance wires 18 and 19 may be joined by their upper ends to the through-rods 20 and 21 or by their lower ends to the metallic sheaths 22 and 23. The rods 20 and 21 are then used as electrical conductors to transmit current from the lower ends of the cylindrical bodies. The conducting through-rods 20 and 21 function not only as electric conductors but also as support means for the cylindrical bodies 16 and 17. The ends of the rods 20 and 21 may also be used as attachment means. Instead of using electric resistance wires wound around the cylindrical bodies, it is also possible to coat the bodies with a suitable electrically conducting layer, such as a layer of metal.

The outwardly directed spring force of the trailing contacts 4 and 5 guarantees that they will always be in contact with the surfaces of the cylindrical bodies and thanks to the design of the connecting parts 2 and 3 the contacts 4 and 5 have a certain pivotal freedom about axes perpendicular to the two cylindrical bodies 16 and 17. This pivotal movement might be likened to torsional vibration. Thanks to the oval tubular part 8 and extensions 9 and 10 which provide guiding units on the float, the float is mounted for sliding movement along the cylindrical bodies and prevented from pivoting about an axis perpendicular to the two cylindrical bodies, as well as stick-slip motion also being prevented. The liquid gauge shown in FIG. 7 may be built into a casing 26, as in FIG. 8, with end walls 27 and 28. The ends of the cylindrical bodies are secured to said end walls. The cylindrical casing is provided with apertures 29,30 and 31 for the passage of liquid. Instead of being smooth, the inner surfaces of the end walls 27 and 28 are rough, e.g., provided with raised portions to prevent adhesion of the float. It is also possible instead to roughen the external surfaces of the float to achieve the same effect.

Depending on how the resistance wires 18 and 19 are connected to the through-rods 20 and 21, the float can indicate zero position either in its upper or lower position.

The design of the trailing contacts in thin, resilient material and their covering at least three turns of the resistance wires ensures an extremely reliable indication of the liquid level as well as causing very low friction between the float and the cylindrical bodies and resistance wires.

I claim:

1. In a liquid level indicator system having a resistance component, a contact component adjustably engaging said resistance component, and a float mounted for movement relative to said resistance component for adjustably varying the engagement of said contact component with said resistance component upon movement of said float; the improvement comprising the resistance component including two vertically elongate bodies, said bodies being in parallel laterally spaced relation to each other, each of said bodies terminating in opposed ends generally coextensive with the ends of the other body, and an outer electrically conductive layer about each body between the opposed ends thereof, the float surrounding said elongate bodies for vertical movement therealong, said float comprising opposed parallel spaced end discs with a guide means therebetween, said end discs having aligned apertures therethrough slidably receiving the eongate bodies through said guide means and precluding relative rotation between the float and the elongate bodies, and the contact component comprising two conductive contacts in electrical contact with each other, each contact engaging against a separate one of said electrically conductive layers on the bodies, and means fixing said contacts to said float for vertical movement therewith along said vertically elongate bodies.

2. The construction of claim 1 wherein the guide means of said float includes a pair of outwardly projecting positioning guides fixed to one of the end discs and defining body guiding continuations of the corresponding aperture.

3. The construction of claim 1 including a casing surrounding said elongate bodies and float vertically movable thereon, said casing including opposed end walls engaged with the opposed ends of said elongate bodies, and a casing wall extending between said end walls.

4. The construction of claim 3 wherein at least one of said casing end walls includes an inner surface providing only limited surface contact with the float, upon engagement of the float therewith.

5. In a liquid level indicator system having a resistance component, a contact component adjustably engaging said resistance component, and a float mounted for movement relative to said resistance component for adjustably varying the engagement of said contact component with said resistance component upon movement of said float; the improvement comprising the resistance component including two vertically elongate cylindrical bodies, said bodies being in parallel laterally spaced relation to each other, each of said bodies terminating in opposed ends generally coextensive with the ends of the other body, and an outer electrically conductive layer about each body between the opposed ends thereof, each said electrically conductive layer being defined by a resistance wire wound about the corresponding elongate body, the float guidingly mounted by means for precluding relative rotation between the float and said two bodies, said float surrounding said elongate bodies for vertical movement therealong, and the contact component comprising two conductive contacts in electrical contact with each other, each contact engaging against a separate one of said electrically conductive layers on the bodies, and means fixing said contacts to said float for vertical movement therewith along said vertically elongate bodies.

6. The construction of claim 5 wherein each contact engages at least three turns of the corresponding wound resistance wire.

7. The construction of claim 6 wherein each of said bodies is provided at at least one end thereof with a sheath of electrically conductive material in electrically conductive contact with the corresponding resistance wire.

8. The construction of claim 5 comprises a pair of metal rods, one metal rod extending longitudinally through each vertically elongate body and defining an electric current conductor.

9. The construction of claim 8 wherein each resistance wire is in electric current conducting engagement with an end of the rod through the corresponding elongate body.

10. In a liquid level indicator system having a resistance component, a contact component adjustably engaging said resistance component, and a float mounted for movement relative to said resistance component for adjustably varying the engagement of said contact component with said resistance component upon movement of said float; the improvement comprising the resistance component including two vertically elongate bodies, said bodies being in parallel laterally spaced relation to each other, each of said bodies terminating in opposed ends generally coextensive with the ends of the other body, and an outer electrically conductive layer about each body between the opposed ends thereof, the float surrounding said elongate bodies and guidingly mounted by means for only vertical movement therealong, and the contact component comprising two conductive contacts in electrical contact with each other, means spring biasing each contact into resilient engagement against a separate one of said electrically conductive layers on the bodies, and means fixing said contacts to said float for vertical movement therewith along said vertically elongate bodies.

11. The construction of claim 10 wherein said contacts are positioned between said bodies and outwardly biased relative to each other and against said conductive layers on the bodies.

12. The construction of claim 10 wherein said contacts and said means spring biasing said contacts are integrally defined from a unitary piece of resilient metal sheeting.

13. The construction of claim 10 wherein the metal sheeting is configured to allow limited rotational movement of each contact.

* * * * *